US008358233B2

(12) United States Patent
Foreman

(10) Patent No.: US 8,358,233 B2
(45) Date of Patent: Jan. 22, 2013

(54) RADAR TARGET DETECTION PROCESS

(75) Inventor: Terry L. Foreman, Colonial Beach, VA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 333 days.

(21) Appl. No.: 12/924,030

(22) Filed: Sep. 14, 2010

(65) Prior Publication Data
US 2012/0313805 A1 Dec. 13, 2012

Related U.S. Application Data

(60) Provisional application No. 61/277,185, filed on Sep. 14, 2009.

(51) Int. Cl.
*G01S 13/00* (2006.01)

(52) U.S. Cl. .......... 342/27; 342/159; 342/162; 342/189; 342/194; 342/195; 342/196

(58) Field of Classification Search .................... 342/27, 342/28, 90, 95–97, 132, 134–135, 159–162, 342/174, 189, 192, 194–196
See application file for complete search history.

(56) References Cited

U.S. PATENT DOCUMENTS

| | | | |
|---|---|---|---|
| 4,894,660 A * | 1/1990 | Thomson et al. ............. 342/129 |
| 4,982,150 A * | 1/1991 | Silverstein et al. ........ 324/76.33 |
| 5,068,597 A * | 11/1991 | Silverstein et al. ........ 324/76.19 |
| 5,351,058 A | 9/1994 | Kretschmer et al. .......... 342/384 |
| 5,361,069 A | 11/1994 | Klimek et al. .................. 342/20 |
| 5,414,428 A | 5/1995 | Gallagher et al. ............. 342/132 |
| 5,570,094 A * | 10/1996 | Armstrong ..................... 342/107 |
| 5,579,011 A * | 11/1996 | Smrek .......................... 342/113 |
| 5,686,922 A * | 11/1997 | Stankwitz et al. ............. 342/196 |
| 5,781,157 A | 7/1998 | Laird ............................ 342/379 |
| 6,100,844 A | 8/2000 | Whiting et al. ................ 342/379 |
| 6,268,821 B1 | 7/2001 | Shrader et al. .................. 342/17 |
| 6,867,726 B1 | 3/2005 | Yu et al. .......................... 342/17 |
| 2010/0134345 A1 * | 6/2010 | Ruggiano et al. .............. 342/159 |

OTHER PUBLICATIONS

Nelander, A.;, "Deconvolution approach to terrain scattered interference mitigation," Radar Conference, 2002. Proceedings of the IEEE, vol., no., pp. 344-349, 2002.*

(Continued)

*Primary Examiner* — John B Sotomayor
(74) *Attorney, Agent, or Firm* — Gerhard W. Thielman, Esq

(57) ABSTRACT

A process is provided for analyzing a radar signal using CLEAN to identify an undetected target in sidelobes of a detected target. The process includes obtaining system impulse response data of a waveform for a point target having a signal data vector based on a convolution under conjugate transpose multiplied by a target amplitude vector plus a noise vector, estimating the target amplitude vector, and applying a CLEAN Deconvolver to remove the detected target from the data signal vector based on the estimate amplitude vector absent the detected target and an amplitude vector of an undetected target. The process further includes building a detected target vector with the amplitude estimate vector, setting to zero all elements of the detected target vector except at an initial time, and recomputing the amplitude estimate vector by a Reformulated CLEAN Detector.

6 Claims, 8 Drawing Sheets

OTHER PUBLICATIONS

Skinner, B.J.; Donohoe, J.P.; Ingels, F.M.; , "Simulation of target responses to high frequency ultra wideband radar signals using the physical optics impulse response," System Theory, 1993. Proceedings SSST '93., Twenty-Fifth Southeastern Symposium on , vol., no., pp. 11-15, Mar. 7-9, 1993.*

See-May Phoong; Vaidyanathan, P.P.; , "One- and two-level filter-bank convolvers," Signal Processing, IEEE Transactions on , vol. 43, No. 1, pp. 116-133, Jan. 1995.*

J.A. Högbom: "Aperture Synthesis with a Non-Regular Distribution of Interferometer Baselines", *Astronomy and Astrophysics Supplement*, 415, 417-426, 1974.

R. Bose: "Sequence CLEAN Technique Using BGA for Contiguous Radar Target Images with High Sidelobes", *IEEE Trans. on Aerospace and Electronic Systems*, 39, 1, 368-373, Jan. 2003.

I.-S. Choi et al.: "One-dimensional Evolutionary Programming-based CLEAN", *Electronics Ltrs*, 37, 6, Mar. 15, 2001.

R. Bose, et al.: "Sequence CLEAN: A Modified Deconvolution Technique for Microwave Images of Contiguous Targets", *IEEE Trans. on Aerospace and Electronic Systems*, 38, Jan. 1, 2002.

H. Deng: "Effective Clean Algorithms for PerfOrmance-Enhanced Detection of Binary Coding Radar Signals", *IEEE Transactions on Signal Processing*, v. 52, No. 1, Jan. 2004.

T.L. Foreman: "Adapting the CLEAN Deconvolver & CLEAN Detector to Doppler Uncertainty", *IEEE Radar Conf.*, 2007.

T.L. Foreman: "Reinterpreting the CLEAN Algorithm as an Optimum Detector", *IEEE Radar Conference*, Apr. 2006.

C.-F. Chang et al.: "Frequency Division Multiplexing Technique for Composite Ambiguity Function Approximation", *Digital Signal Processing*, 16, 5, 488-497, 2005.

\* cited by examiner

RADAR TARGET DETECTION PROCESS

CROSS REFERENCE TO RELATED APPLICATION

Pursuant to 35 U.S.C. §119, the benefit of priority from provisional application 61/277,185, with a filing date of Sep. 14, 2009, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to improving range resolution of radar-illuminated targets. In particular, the invention enables the radar to detect and record data on a small target that could otherwise be obscured by larger targets.

The issue of range resolution has been has been an important part of radar design and research since the beginning of radar. Early designers of radar understood that using a short pulse for their radar allowed for separating closely spaced targets better than long pulses. However, imparting sufficient energy on the target to ensure its detection required radar pulses be of a certain minimum length, determined by the radar range equation and transmitter peak power. Hence, the requirement to achieve energy on target often trumped the requirement to distinguish multiple targets.

The first major advance in the area of range resolution occurred with the development of pulse compression. Pulse compression is achieved by modulating the radar pulse and then processing it with a matched filter on receiver. For proper modulation of the transmitted pulse, the response of the matched filter compresses the pulse to a width that can be reduced by the time-bandwidth product of the modulated pulse. This enables detection of two identical amplitude targets that can be spaced closer by the time-bandwidth product of the modulated pulse. Good modulation produces small sidelobes.

FIG. 1 shows a graphical view 100 of a pulse received signal signal. The abscissa 110 represents time or range, and the ordinate 120 represents signal strength or amplitude. At the origin where time and range are zero, the amplitude reaches maximum extent denoted as an un-modulated pulse 130 orthogonal to the span 140.

A matched filter response 150 provides a linear rise across the span's extent. A pulse-compression matched filter response 160 to the modulated pulse exhibits a narrower extent across the span 140 than for the un-modulated, with sidelobes 170 disposed adjacent thereto. However, sidelobes can interfere with the detection of small targets in the presence of large targets.

FIG. 2 shows a graphical view 200 of a secondary signal. The abscissa 210 represents time or range, and the ordinate 220 represents signal strength or amplitude. The pulse-compression matched filter response 160 can be compared against a second target, which from compression includes a detectable response 230 and anon-detectable response 240 that remains obscured by the sidelobes 170.

Under these circumstances, one can observe that a closely spaced target of equal amplitude can easily be detected. However, a target whose amplitude is no larger than the sidelobes cannot be reliably detected because the sidelobes interfere. Therefore, pulse compression sidelobes can produce significant limitations on the ability to detect or distinguish two closely spaced targets when one of the targets has significantly smaller amplitude than the other target.

SUMMARY

Conventional range resolution techniques yield disadvantages addressed by various exemplary embodiments of the present invention. In particular, various exemplary embodiments provide a process for analyzing a radar signal using CLEAN to identify an undetected target in sidelobes of a detected target. The process includes obtaining system impulse response data of a waveform for a point target having a signal data vector based on a convolution under conjugate transpose multiplied by a target amplitude vector plus a noise vector, estimating the target amplitude vector, and applying a CLEAN Deconvolver to remove the detected target from the data signal vector based on the estimate amplitude vector absent the detected target and an amplitude vector of an undetected target.

In additional exemplary embodiments, the process further includes building a detected target vector with the amplitude estimate vector, setting to zero all elements of the detected target vector except at an initial time, and recomputing the amplitude estimate vector by a Reformulated CLEAN Detector.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
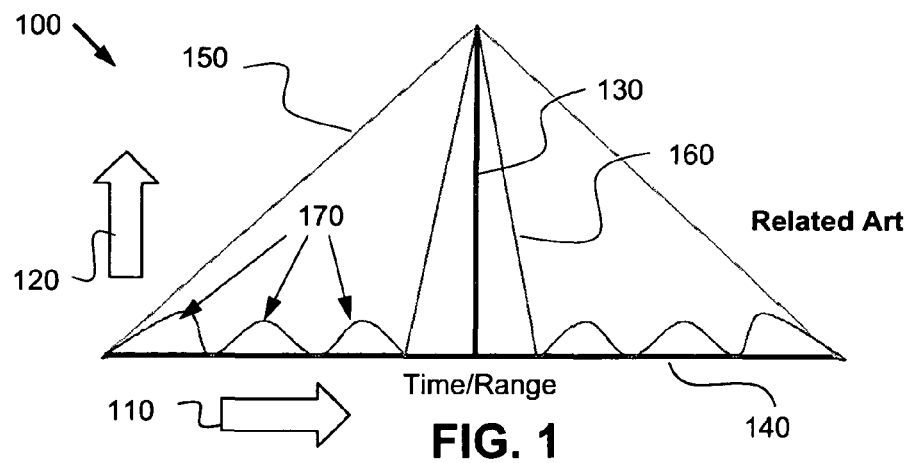
FIG. 1 is a graphical view of a primary compression signal.
Figure 2:
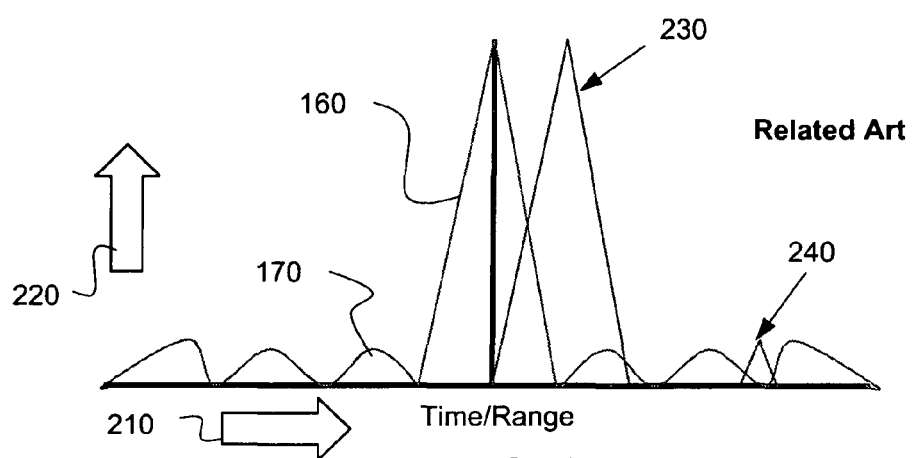
FIG. 2 is a graphical view of a secondary compression signal.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

There have been many approaches to solve this problem with two major lines of attack. The first has been to find modulation techniques to reduce the sidelobes. The second has been to use filters other than matched filters to reduce the sidelobes. The former approach is greatly constrained by practical engineering limitations on signal generation.

Radar designers normally operate their transmitters in a saturated condition to maximize the energy in the pulse. This means that modulations schemes are limited to phase modulated schemes. The second line of attack is replacing the matched filter with a filter that compresses the pulse and produce lower sidelobes. Although such filters are feasible to design, the matched filter is the optimum filter for detecting targets. Therefore, other filters are suboptimal, meaning that there causing a loss in detectability. Consequently, practical mismatched filters still face limitations on their sidelobe performance.

Another technique applied to this problem is the CLEAN algorithm. The CLEAN algorithm was developed by astronomers to increase the resolution of photographs of stars, being originally documented by J. A. Högbom: "Aperture Synthesis with a Non-Regular Distribution of Interferometer Baselines", *Astronomy and Astrophysics Supplement*, v. 415, pp. 417-426.

CLEAN works by subtracting the point spread function (PFS) of the brightest star. The PFS is the response to a point source. For example, the PFS can be the response of the image due to the finite resolution of optics. This procedure is repeated with the remaining brightest source until the remaining scene is at the noise floor or some other predefined criteria. The amplitude and position of each source is noted and represents the Cleaned image. In some cases the point sources are convolved with the PFS minus the sidelobes to produce the Cleaned image.

A number of reference papers have applied the CLEAN algorithm to radar imaging and detection for multiple closely-spaced targets. These include:
(1) R. Bose: "Sequence CLEAN Technique Using BGA for Contiguous Radar Target Images with High Sidelobes", *IEEE Transactions on Aerospace and Electronic Systems*, v. 39, no. 1, pp 368-373, January 2003;
(2) I.-S. Choi and H.-T. Kim: "One-dimensional Evolutionary Programming-based CLEAN", *Electronics Letters*, v. 37, no. 6, 15 Mar. 2001;
(3) R. Bose, A. Freedman, and B. D. Steinberg: "Sequence CLEAN: A Modified Deconvolution Technique for Microwave Images of Contiguous Targets", *IEEE Transactions on Aerospace and Electronic Systems*, v. 38, no 1, January 2002; and
(4) H. Deng: "Effective CLEAN Algorithms for Performance-Enhanced Detection of Binary Coding Radar Signals", *IEEE Transactions on Signal Processing*, v. 52, no. 1, January 2004.

These above-identified papers have refined the CLEAN algorithm to allow the recovery of very closely spaced targets (i.e., targets in adjacent range cells). However, they do not give any fundamental performance limit of their respective algorithms or make any claim of optimality. Additionally, they have limited performance for very small targets in the presence of large targets.

The process disclosed in exemplary embodiments employs an algorithm that assumes the entire radar listen interval has been band limited with a suitable bandpass filter, digitized and is available for processing. The signal model can be expressed in eqn. (1) as:

$$y = \tilde{W}^H c + n, \qquad (1)$$

where y represents the received observation data, $\tilde{W}$ represents the convolution operation, superscript H is conjugate transpose operation, c is the vector of target amplitudes, and n is a vector of additive white Gaussian noise (AWGN). Multiplication by $\tilde{W}$ represents the operation of convolution as an array such that:

$$\tilde{W} = \begin{bmatrix} 0 & \cdots & 0 & w^t \\ 0 & \cdots & w^t & 0 \\ & \vdots & & \\ w^t & \cdots & 0 & 0 \end{bmatrix}, \qquad (2)$$

where w represents the vector of the impulse response of the transmitted waveform plus the receive chain, superscript t is the transpose operation.

This signal model involving AWGN is described in two reference papers published on this algorithm, both incorporated by reference in their entireties to the specification:
(5) T. L. Foreman: "Adapting the CLEAN Deconvolver and CLEAN Detector to Doppler Uncertainty", *IEEE Radar Conference*, 2007; and
(6) T. L. Foreman: "Reinterpreting the CLEAN Algorithm as an Optimum Detector", *IEEE Radar Conference*, April 2006.

Estimating the target amplitude vector c using the CLEAN Deconvolver is performed as:

$$\hat{c} = (\tilde{W}\tilde{W}^H)^{-1}\tilde{W}y, \qquad (3)$$

where $\hat{c}$ is the minimum variance unbiased estimate of the target amplitude vector c. By contrast, a matched filter would yield:

$$\hat{c}_{coor} = \tilde{W}y, \qquad (4)$$

where $\hat{c}_{corr}$ represents the matched filter estimate.

Application of the CLEAN algorithm involves three elements. First, the spectrum of the data can be controlled by proper selection of filtering and sample rate. The second element is obtaining the point spread function (PSF), also known as system impulse response. This is also called the calibration problem. The third element is applying combinations of the CLEAN Deconvolver, Correlator and CLEAN Detector, depending on signal-to-noise ratio (SNR) of the data and the quality of the PSF, to produce the best estimate of the target amplitude vector c.

The first element is the least apparent part of this approach. This is due to considerations in the frequency-domain, while the entire deconvolution approach can be based completely on time-domain analysis.

The influence of spectral shaping involves the operation of deconvolution in the time domain, which is equivalent to multiplying the reciprocal of the PSF Fourier transform times the Fourier transform of the received or observed data. Thus in the time domain, y(t) represents the observed data, h(t) is the impulse response of the radar, and c(t) is the target complex (i.e., collection or scatters), such that the signal model can be represented by:

$$y(t)=h(t) \otimes c(t), \tag{5}$$

where $\otimes$ is the convolution operator between the impulse response and the target complex (of scatters).

In the frequency domain, for Y(f), H(f) and C(f) representing respective Fourier transforms of y(t), h(t), and c(t), then eqn. (5) can be rewritten in eqn. (6) as:

$$Y(f)=H(f)\cdot C(f), \tag{6}$$

where such convolution in the Fourier transforms domain is replaced by multiplication.

Using eqn. (6) to estimate target amplitude c(t) is done by solving for C(f) and taking the inverse Fourier transform to produce the integral:

$$\hat{c}(t) = \int_{-\infty}^{\infty} \frac{Y(f)}{H(f)} e^{-j2\pi ft} df, \tag{7}$$

where ĉ(t) is the continuous time estimate of the target complex.

Next, the response of a point target is recognized in the time domain as:

$$y(t)=h(t) \otimes \delta(t-t_0), \tag{8}$$

where $t_0$ corresponds to the range of the target and δ represents an impulse function. When the range is arbitrarily set to $t_0=0$, in the limit observed frequency transform Y(f) approaches the value impulse response transform H(f), such as the ratio Y(f)÷H(f) becomes unity, the Fourier transform of eqn. (8) can be incorporated into eqn. (7) to obtain:

$$\hat{c}(t) = \int_{-f_0}^{f_0} \frac{H(f)}{H(f)} e^{-j2\pi ft} df = \int_{-f_0}^{f_0} e^{-j2\pi ft} df = 2f_0 \frac{\sin(2\pi f_0 t)}{2\pi f_0 t}, \tag{9}$$

where ĉ(t) constitutes a time-dependent sinc function of $f_0 t$ obtained from the inverse Fourier transform by integrating over the bandwidth $f_0$ of the radar waveform.

Figure 3:
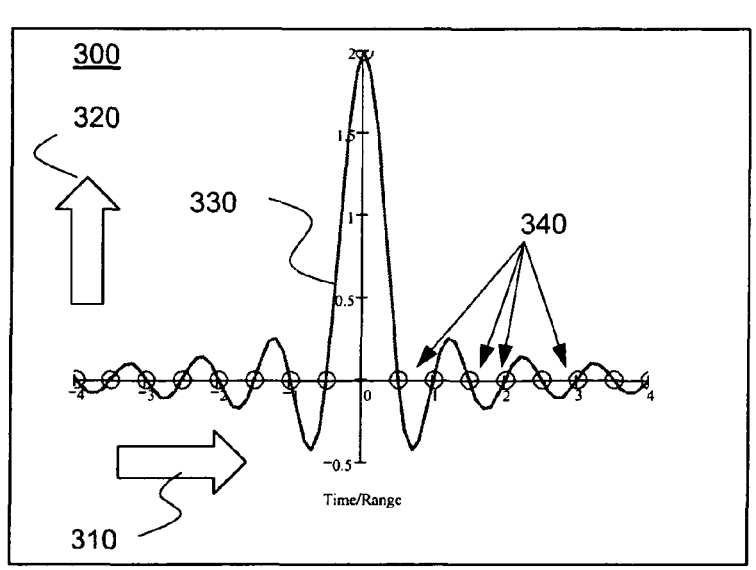
FIG. 3 is a graphical view of a sinc plot.

Signal characteristics can be visually described by the accompanying drawings. FIG. 3 shows a graphical view 300 for a Response of Deconvolution to a single point target. The abscissa 310 represents time or range, and the ordinate 320 represents amplitude.

The response to the single point target can be described as a "sinc" pulse having an attenuated oscillating waveform 330, intersecting the abscissa 310 at regular intervals denoted by circles 340 are the values of the "sinc" function at values of time equal to integral multiples of the sample time T=1/(2$f_0$).

The normalized sinc function used for digital signal processing and communication may be expressed as:

$$sinc(x) \equiv \frac{\sin(\pi x)}{\pi x}, \tag{10}$$

in which the sinc function of eqn. (10) equals unity at the x=0 singularity) and has a rectangular Fourier transform.

Note that when the continuous time function ĉ(t) is sampled a intervals of 1/(2$f_0$) then all values of ĉ(t) equal to zero except for the value at t=0. This means the time sidelobes (i.e., values of ĉ(t) at times other than where the target truly exists) are zero. This is illustrated in FIG. 3 in which the circles 340 along the abscissa 310 indicate the values of ĉ(t) for a sample rate of 2$f_0$. Targets that are arbitrarily small can be observed in the presence of larger targets, for sufficiently high SNR, because the sidelobes can be minimized to be arbitrarily small.

To restate, achieving arbitrarily small range time sidelobes is achievable by controlling the bandwidth of the system and sample interval to guarantee that Y(f)÷H(f)=1 for the frequency interval of -$f_0$<f<$f_0$, or |f|≦$f_0$, such that frequency is bounded by the bandwidth ±$f_0$. Note that processing data in this manner might not necessarily satisfy the Nyquist sampling rate criteria. However, this is not required to achieve improved range resolution performance.

The second element is obtaining the PSF or impulse response of the radar. This represents an important aspect of applying the CLEAN algorithm, because any errors in determining the PSF can significantly degrade or destroy the performance of the CLEAN algorithm. The overall response of the system includes the radar transmitter, antenna, and receive path to the point that the baseband data are provided for processing and detection.

Figure 4:
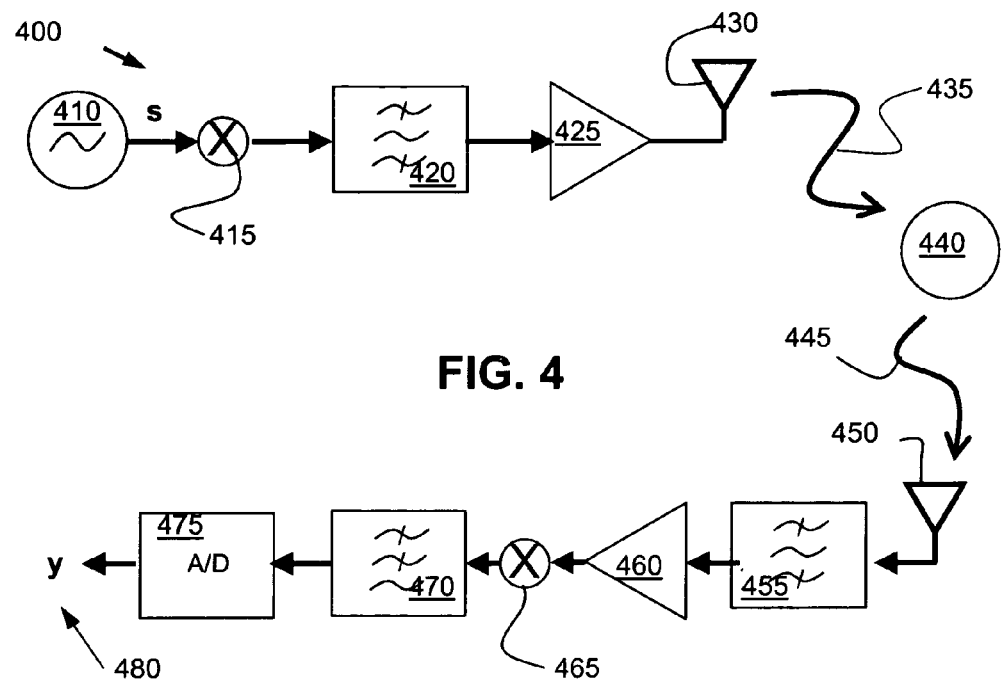
FIG. 4 is a block diagram view of a radar system.

FIG. 4 provides a block diagram of a radar system 400. A waveform generator 410 generates a baseband signal s, which is converted to a carrier frequency at mixer 415 and processed through a band-pass filter 420 before being submitted to a transmitter 425 and emitted through a transmit antenna 430 as a propagating signal 435 aimed at a spherical target 440, which reflects radiated energy as a reflected signal 445.

A receive antenna 450 captures the reflected signal 445, which is processed through a band-pass filter 455 before gain is applied by a low noise amplifier 460. The amplified signal is downconverted by a mixer 465, run through a low-pass filter 470, and digitized by an analog-to-digital (A/D) converter 475 to provide observed broadband data y as the output 480. Thus observed data vector y obtained from a point target such as the sphere 440 is the impulse response or PSF of the entire radar.

When the radar uses only one waveform, obtaining calibration can be straightforward. One merely needs to obtain samples in an observation data vector y that coincides with the return for a strong point target (i.e., high SNR). These samples represent the impulse response of the whole system. Thus, the effects of all the filters and amplifiers in the radar receive and transmit paths are accounted for.

Under this situation, using the formulation of the earlier cited papers (Foreman, 2006), one can establish that the impulse response vector w of the transmitted waveform is equivalent to the observed data vector y, such that w=y. Obtaining the impulse response vector w enables formation of convolution operation $\tilde{W}$ to employ the CLEAN algorithm.

However, for many radars, using the above technique is impractical due to the fact that the radar uses many different waveforms. Thus, a received sample may be obtained for every waveform used. The following approach is used to synthesize the impulse response vector w (and thus convolution operation) $\tilde{W}$ for different waveforms when only one received sample from one waveform is available.

Calibration synthesis assumes that one good sample is available, denoted as observed data vector $y_1$ for one driving waveform, denoted as $s_1$. Based on this, the signal model can be expressed in eqn. (11) as:

$$y_1 = \tilde{S}_1 h, \qquad (11)$$

where h is the impulse response of the system separate of the driving waveform $s_1$ (output of 410 of FIG. 4) and $\tilde{S}_1$ is the convolution matrix constructed from that driving waveform vector $s_1$. Therefore, the convolution matrix $\tilde{S}_1$ is of the form:

$$\tilde{S}_1 = \begin{bmatrix} s_1 & 0 & \cdots & 0 \\ s_2 & s_1 & & 0 \\ & \vdots & & \\ s_p & s_{p-1} & \cdots & s_{p-l+1} \end{bmatrix}, \qquad (12)$$

where elements $s_i$ are the elements of driving waveform vector $s_1$ from i=1, 2, . . . p.

In eqn. (11), observed data vector $y_1$ represents a column vector of length p, convolution matrix $\tilde{S}_1$ has size of p×l, and impulse response h is a column vector of length l. The parameter l corresponds to the length of the impulse response of the radar, excluding the driving waveform vector s. Also, p is the length of the total impulse of the radar including the driving waveform vector s. Using this signal model, the calibration data for second driving waveform vector $s_2$ can be estimated in eqn. (12) as:

$$y_2 = \tilde{S}_2 (\tilde{S}_1^H \tilde{S}_1)^{-1} \tilde{S}_1^H y_1, \qquad (13)$$

where $y_2$ is the second observed data vector adjusted by calibration from the first observed data vector $y_1$.

Thus for waveform $s_2$ the impulse response (or PSF) is inferred from the second observed data vector $y_2$. The convolution matrix $\tilde{S}_2$ is constructed from the second driving waveform vector $s_2$ inferred from calibration of the first driving waveform vector $s_1$. Therefore, convolution operation $\tilde{W}$ is determined by setting impulse response vector equal to the second observed data vector, $w=y_2$.

The third element is the application of the various forms of the CLEAN algorithm developed in the pervious Foreman papers, plus the reformulated CLEAN Detector described below. These processes are applied based on the properties of the observed data vector y. For data consisting of all uneclipsed targets, the process uses the CLEAN Deconvolver and reformulated CLEAN Detector, as in the 2007 Foreman paper.

Data that contain eclipsed targets benefit from the application of the CLEAN Detector. In all cases, target Doppler can preferably be taken into account. As described in the 2006 Foreman paper, uncompensated target Doppler destroys the performance of the CLEAN Deconvolver and CLEAN Detector. Therefore, the Doppler for high SNR targets in the scene should preferably be determined or estimated if unknown, and included in the CLEAN algorithms.

The CLEAN Deconvolver should be used for the detection of all high SNR uneclipsed targets, as described in eqn. (3). This resolves targets to the nearest range sample. The range-time sidelobe performance of the CLEAN Deconvolver can be determined by the selection of filter and sampling rate, as discussed in element-1 and the SNR of the calibration data from element-2.

When the SNR of the large targets is high and the SNR of the small targets is not, a correlator is required to detect the targets. The CLEAN Deconvolver can be used in conjunction with the correlator to detect the large targets. This can be accomplished by subjecting the vector $\hat{c}$ in eqn. (3) to a threshold test that determines which elements have targets that can be detected by the CLEAN Deconvolver.

Next, setting these elements to zero removes them from the vector to produce a small target vector $c^-$, which now contains noise and targets too small to be detected with the CLEAN Deconvolver of eqn. (3). Next, inverting the CLEAN Deconvolver reproduces the observed data vector y without the large targets obscuring the smaller ones. Combining this with the correlation function is performed in eqn. (14) as:

$$\bar{c} = \tilde{W} \tilde{W}^H c^-, \qquad (14)$$

where $\bar{c}$ is the estimate of the scene minus the large targets and $c^-$ represents the small target vector. Thus eqn. (14) applies the correlator that maximizes SNR allowing the detection of the small targets without being obscured by the sidelobes of the large targets removed.

For situations in which the CLEAN Deconvolver combined with the correlator does not provide adequate performance, the correlator combined with the Reformulated CLEAN Detector should be applied. This is accomplished by first determining the location and amplitude of all the large targets, and may be performed with the CLEAN Deconvolver provided the target SNRs are sufficient. The correlator can be used for low SNR targets.

The next step is to build the large target vector $c^+$ by including the amplitude estimates of the large targets detected. Every other element of large target vector $c^+$ is set to zero. The final step is to compute in eqn. (15) the Reformulated CLEAN Detector as:

$$\bar{c} = \tilde{W}(\tilde{W}^H c^+ c^{+H} \tilde{W} + I)^{-1} \qquad (15)$$

where noise amplitude is assumed to be unity, I is an identity matrix of the noise amplitude, and the elements of $\bar{c}$ are evaluated against a threshold to detect previous undetected small targets. In this formulation $c^+$ (vector of large targets) constitutes interference in a similar manner as receiver noise is in eqn. (13). This process occludes the large target vector $c^+$ so as to enable detection of small targets hidden in the sidelobe clutter.

The advantages of this methodology is improved range resolution and sidelobe performance meaning that targets can be resolved at closer ranges and with larger differences in amplitude. The performance is limited only by bandwidth and SNR. Performance is virtually unaffected by waveform coding. Only the waveform bandwidth has such an influence, as its intrinsic range-time sidelobe performance does not limit what can be achieved with this CLEAN approach. Therefore, large improvements can practically and economically be accomplished in existing radars with only signal processing changes, rather than by upgrades to transmission or reception hardware.

Figure 5:
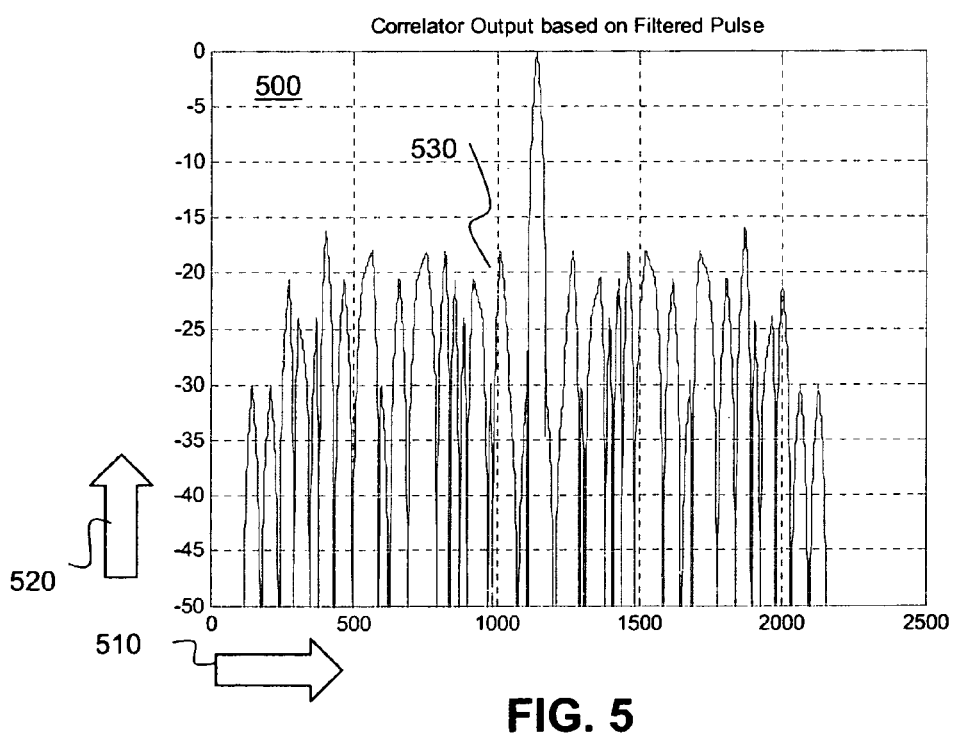
FIG. 5 is a graphical view of a Correlator output based on a filtered pulse.

Performance improvements are illustrated in the following series of drawings. FIG. 5 illustrates a graphical view 500 for Correlator Output based on a filtered pulse, with the target in the center. The plot shows time/range representing the abscissa 510 and SNR in decibels (dB) as the ordinate 520. The output signal 530 of a hypothetical radar using a 32-chip derivative phase shift keying (PSK) waveform with the each chip repeated sixteen times. The range time sidelobes are only 17 dB down from the peak of the target response. In this example, the Range-Time sidelobes prevent detecting smaller targets.

Figure 6:
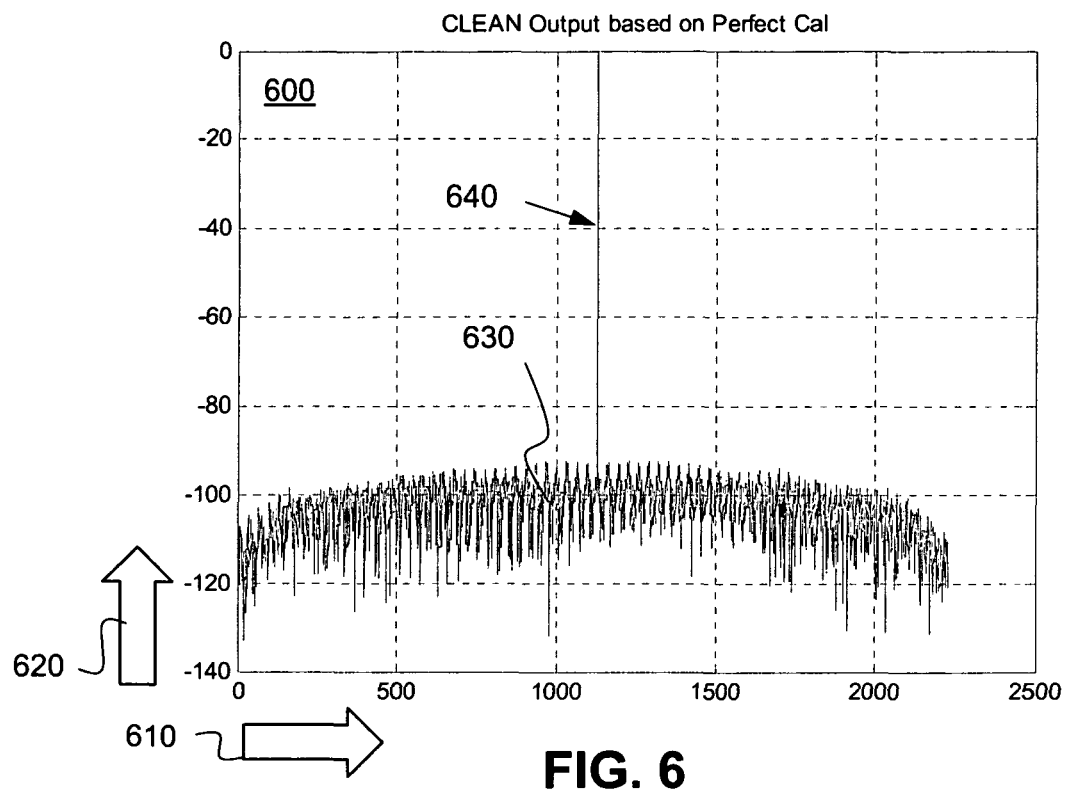
FIG. 6 is a graphical view of a CLEAN Deconvolver output based on perfect calibration.

FIG. 6 illustrates a graphical view 600 for CLEAN Output based on perfect calibration, with the target in the center. The plot shows frequency representing the abscissa 610 and SNR in dB as the ordinate 620. The output signal 630 of shows the performance possible with a measured PSF at high SNR. The target, indicated by the sharp pulse signal 640 is localized to a single range cell and Range-Time sidelobes are over 90 dB down from the peak of the target response. This demonstrates the importance of the first element of this methodology, namely controlling the frequency spectrum and sampling rate. In addition this demonstrates the importance of having a PSF measurement with high SNR.

Figure 7:
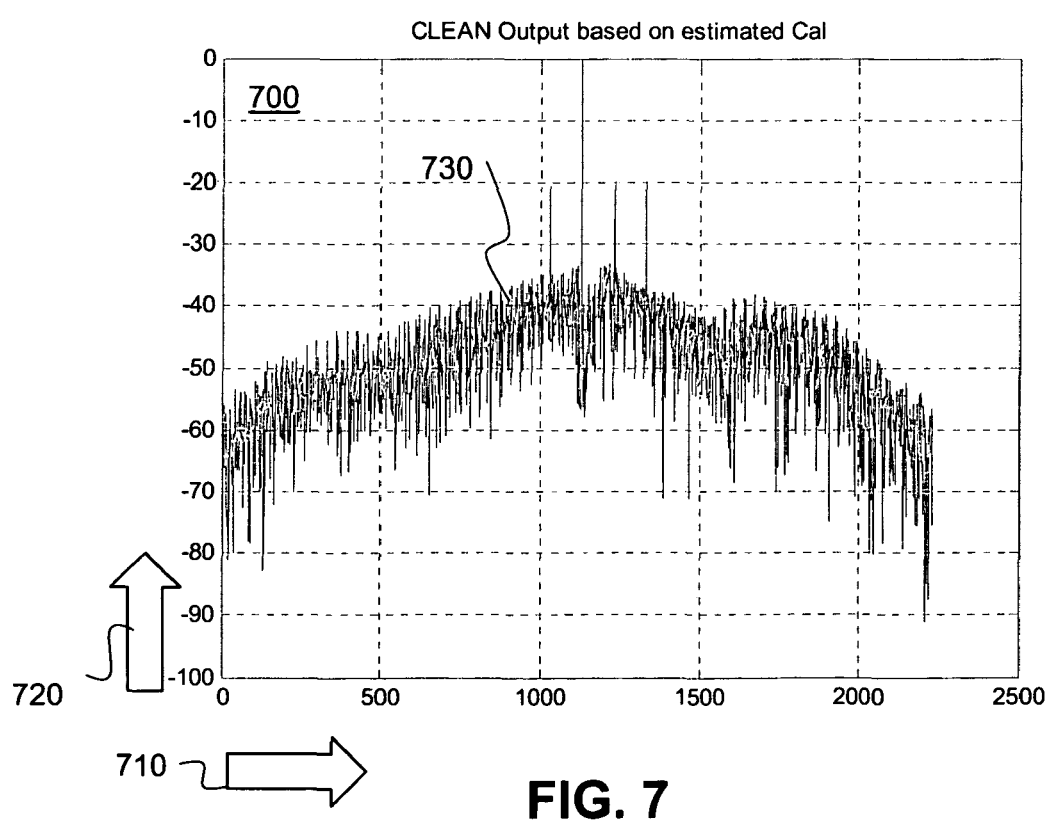
FIG. 7 is a graphical view of a CLEAN Deconvolver output based on estimated calibration.

FIG. 7 illustrates a graphical view 700 for CLEAN Deconvolver Output based on estimated calibration, with the target in the center. The plot shows range-time representing the abscissa 710 and SNR in dB as the ordinate 720. The output signal 730 is based on synthesizing the PSF for a different phase code from the measured PSF associated with the perfect calibration plot 600, with attendant degradation of the range-time sidelobes by comparison.

However the range-time sidelobes are still very good and enable the detection of the three smaller targets that could not be seen in the initial Correlator Output plot 500. Also, the smaller targets are localized each to a single range cell. Thus, the CLEAN Deconvolver is the preferred process for sufficient SNR.

Figure 8:
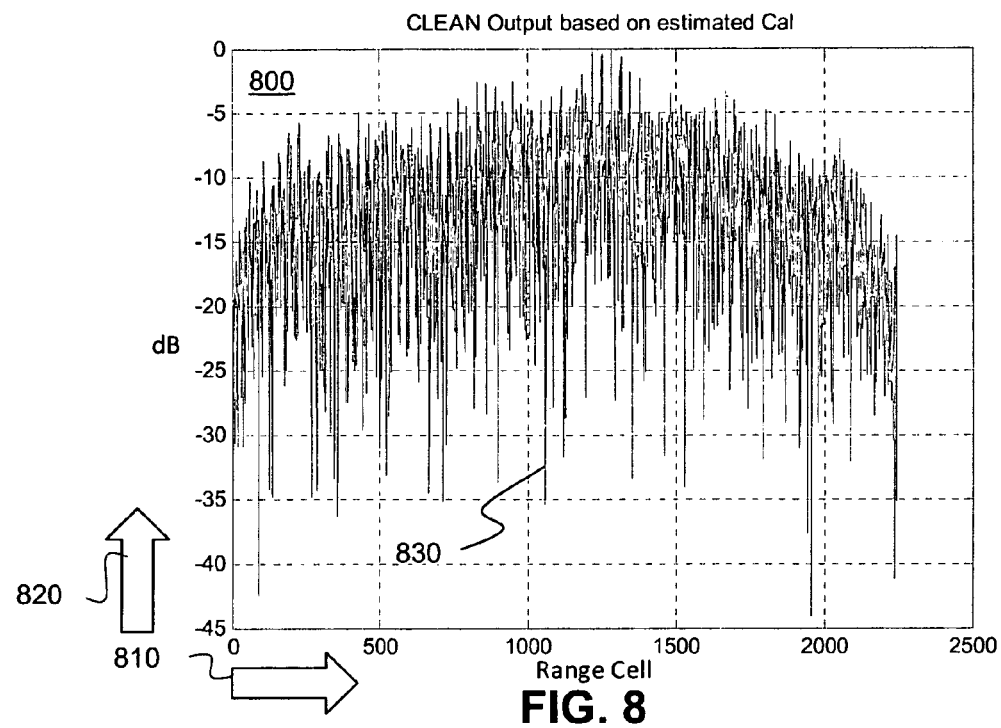
FIG. 8 is a graphical view of a CLEAN Deconvolver output for small SNR targets.

FIG. 8 shows a graphical view 800 of a CLEAN Deconvolver Output for small SNR targets. This plot 800 shows range-time representing the abscissa 810 and SNR in dB as the ordinate 820. The output signal 830 exhibits considerable noise that obscures secondary targets.

The final example is the application of the Reformulated CLEAN Detector. To illustrate this, the same target complex was simulated with a much lower SNR. In this case the CLEAN Deconvolver could not detect the largest target. This is illustrated in CLEAN Output plot 800. Here the SNR of the large target is 11 dB while the SNR of the three small targets is −4 dB.

Figure 9:
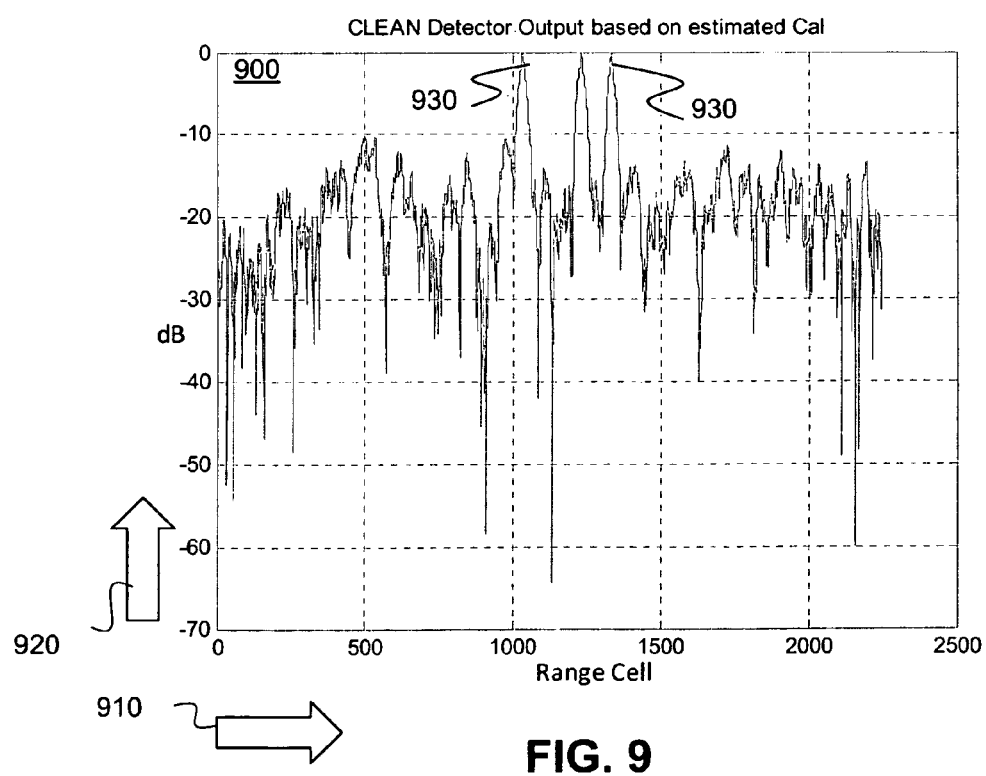
FIG. 9 is a graphical view of a Reformulated CLEAN Detector output for small SNR targets.

FIG. 9 shows a graphical view 900 of a Reformulated CLEAN Detector output for small SNR targets. This plot 900 shows range-time representing the abscissa 910 and SNR in dB as the ordinate 920. The three smaller targets 930 can clearly be seen since the large target has been removed. This is contrast to 500 and 800 in which the small targets could not be seen.

Figure 10:
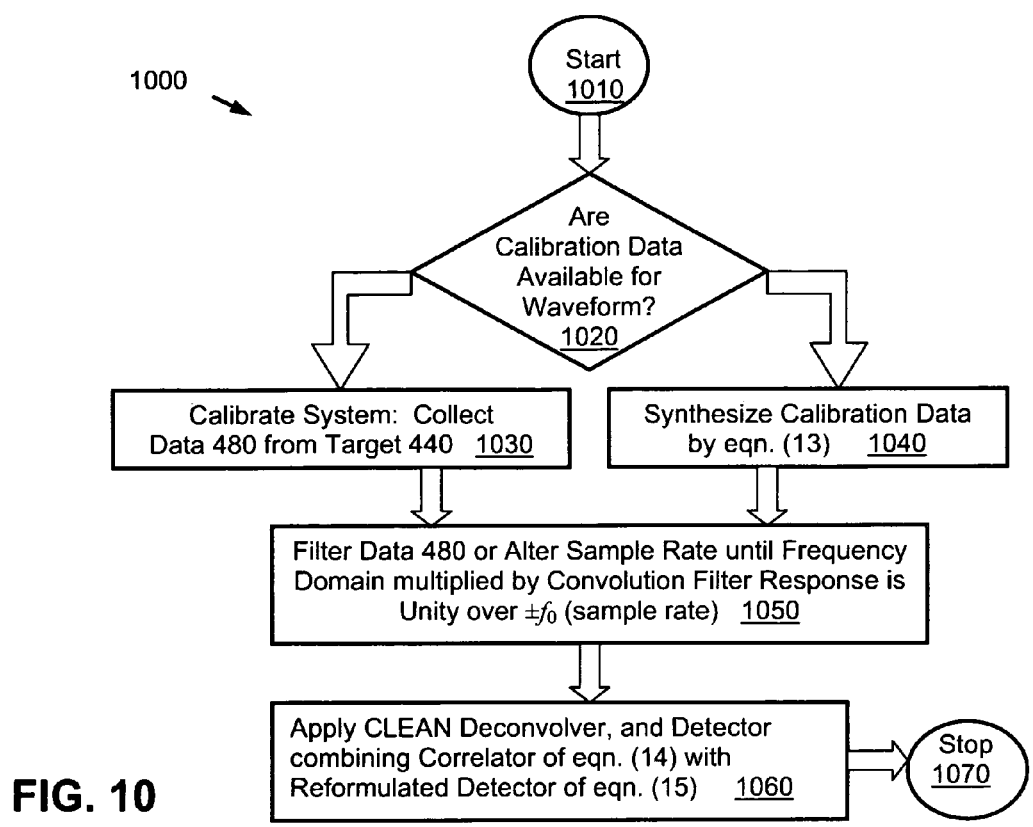
FIG. 10 is a block diagram view of a flowchart using the CLEAN Detector.

FIG. 10 shows a block diagram view 1000 of a flowchart with the process of applying the CLEAN algorithm technique for detecting a small target. The process begins at step 1010 for each radar waveform to be evaluated. A query 1020 determines whether calibration data are available for the waveform. If so, the process collects data 480 at step 1030 from the point-like spherical target 440 (as indicated in the block diagram 400). The observed data 480 provide the impulse function or PSF of the radar. If data are unavailable, then the PSF may be synthesized at step 1140 to apply eqn. (13) from a single measurement of PSF (i.e., for an alternate available waveform). Note that improved performance results from high SNR values.

Subsequent to steps 1030 or 1040, the process continues to control the frequency response and sampling rate at step 1050. The PSF in the frequency domain multiplied by the convolution filter response can be set to unity over the sampling rate $\pm f_0$ or written $1/(2f_0)$ This can be verified by applying the CLEAN Deconvolver to the calibration data, such as in plot 600. Low range-time sidelobes in the signal 630 indicate that the calibration data are valid, and that the frequency response and sampling rate have been properly controlled.

At subsequent step 1060, the CLEAN Deconvolver and Detector may be applied to detect or measure amplitude of targets, depending on the SNR of the various targets. If all targets of interest have high SNR, then the CLEAN Deconvolver or else the CLEAN Detector can be used to provide maximum amplitude measurement accuracy and resolution performance.

Alternatively, if some of the targets of interest possess SNR too small to be observed by the CLEAN Deconvolver or the CLEAN Detector, then these may be combined with the correlator eqn. (14) and Reformulated CLEAN Detector eqn. (15) to resolve the obscured target. The process then stops at step 1070 for that waveform, and returns to the initial step 1010 if evaluating another waveform.

Figure 11:
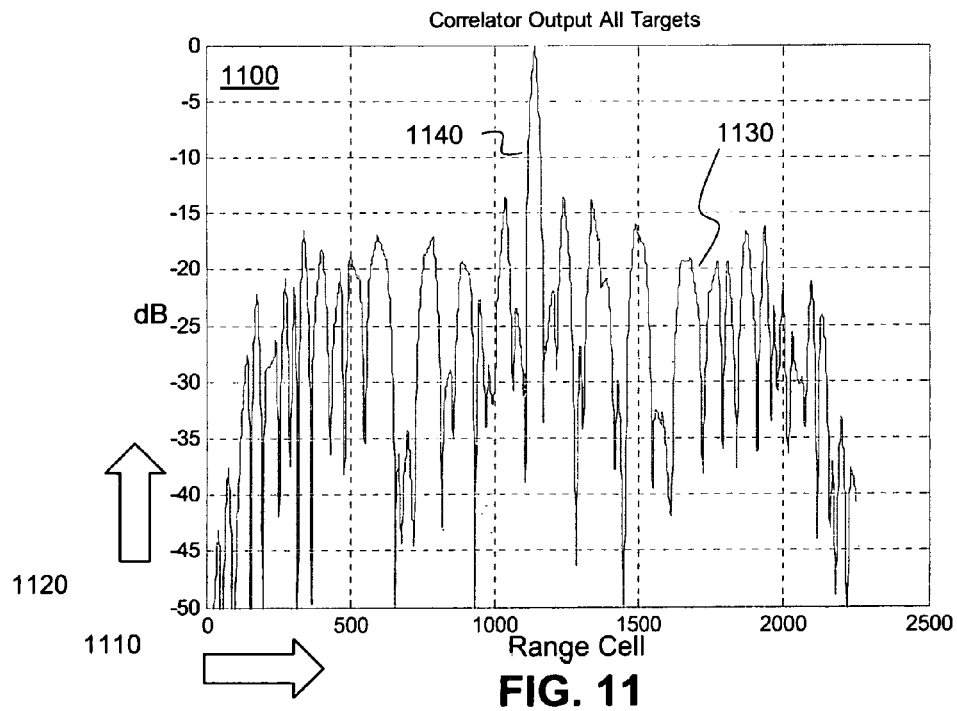
FIG. 11 is a graphical view of a CLEAN Correlator output for all targets.

FIG. 11 shows a graphical view 1100 of a second example performance results. In this example for Correlator Output for All Targets, four targets are under investigation, but only one can be reliably detected due to the sidelobes. This plot 1100 shows range-time representing the abscissa 1110 and SNR in dB as the ordinate 1120. The signal 1130 obscures all but the maximum target indicated by spike 1140.

As previously described, the matched filter or correlator provides the maximum output SNR for additive white noise. The plot 1100 shows the output of a hypothetical radar using a 32-chip derivative phase shift keying waveform with the each chip repeated sixteen times, similar to plot 500. The range time sidelobes are only 17 dB down from the peak of the target response. A large center target has 35 dB SNR, whereas by contrast and three smaller ones has only 26 dB SNR. Only the large target can be reliably detected at spike 1140 due to the range-time sidelobes of the waveform used.

Figure 12:
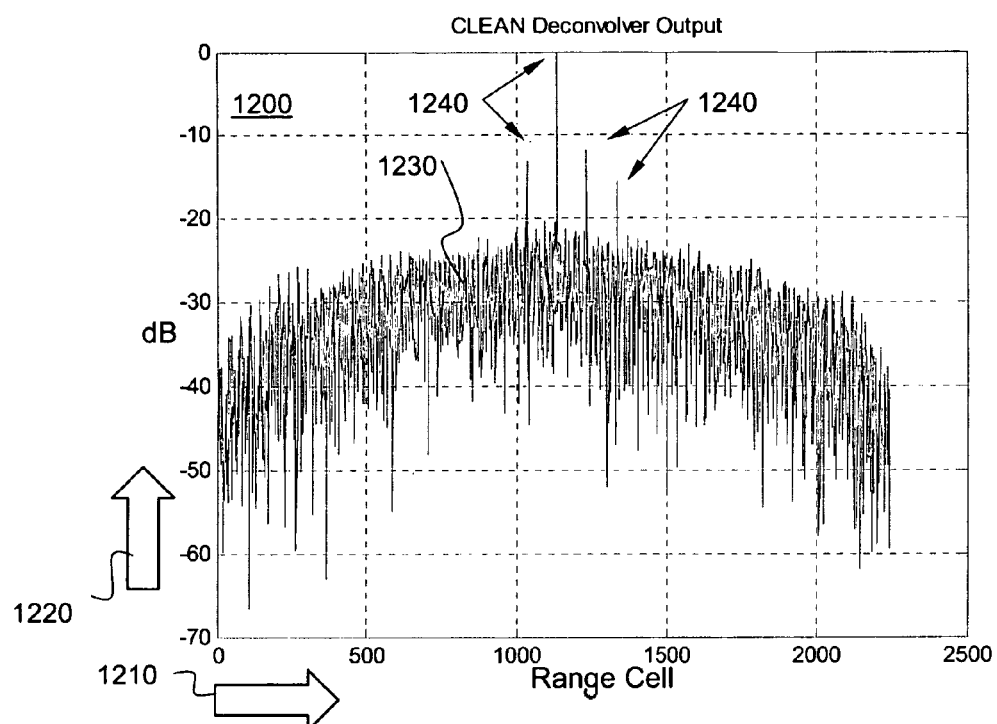
FIG. 12 is a graphical view of a CLEAN Deconvolver output for high SNR targets.

FIG. 12 shows a graphical view 1200 with the same data processed by the CLEAN Deconvolver. This plot 1200 shows range-time representing the abscissa 1210 and SNR in dB as the ordinate 1220. Within the signal 1230, the target peaks 1240 can be observed. In this plot 1200, all four targets are distinguishable, showing the strength of the Deconvolver such that targets can be localized to a single range cell. The targets are not injected at the range cell boundaries, but instead are disposed in straddling range cells by oversampling the input data and then filtering and down-sampling.

Figure 13:
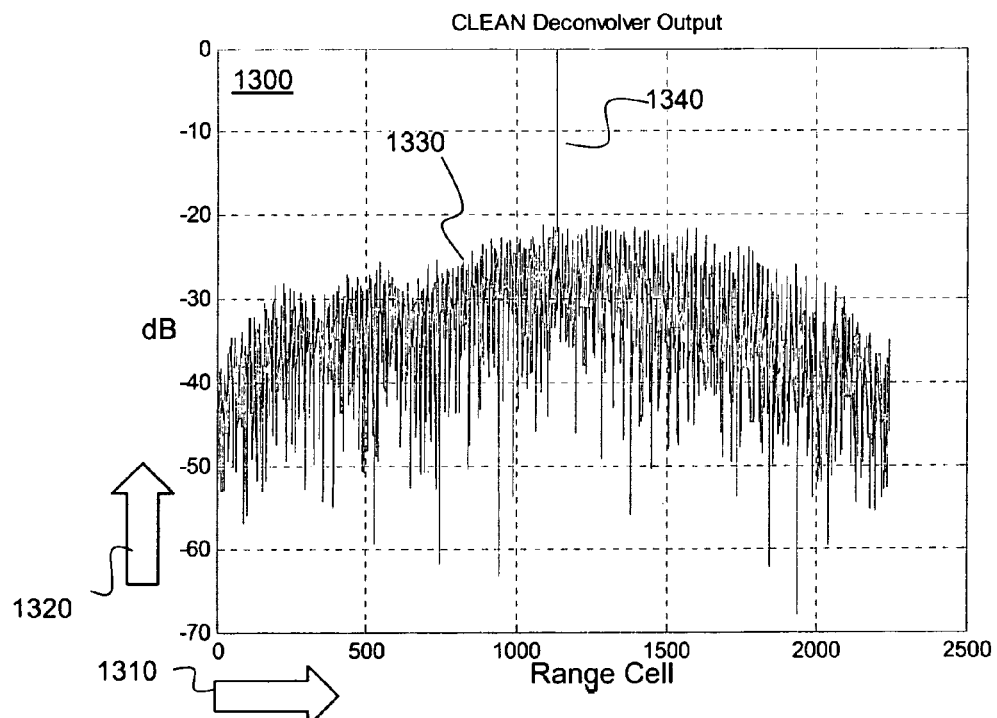
FIG. 13 is a graphical view of a CLEAN Deconvolver output for a large target.

FIG. 13 shows a graphical view 1300 of the effect of additional noise. In this next situation to be considered, the smaller targets have such low SNR at 12 dB that they can not be seen with the CLEAN Deconvolver. This plot 1300 shows range-time representing the abscissa 1310 and SNR in dB as the ordinate 1320. The signal 1330 obscures all but the largest spike 1340. The noise prevents the detection of the smaller targets. While not shown, the correlator also fails to detect the smaller targets due to the range-time sidelobes of the waveform. Here, only the largest target can be observed as the spike 1340 by the CLEAN Deconvolver.

Figure 14:
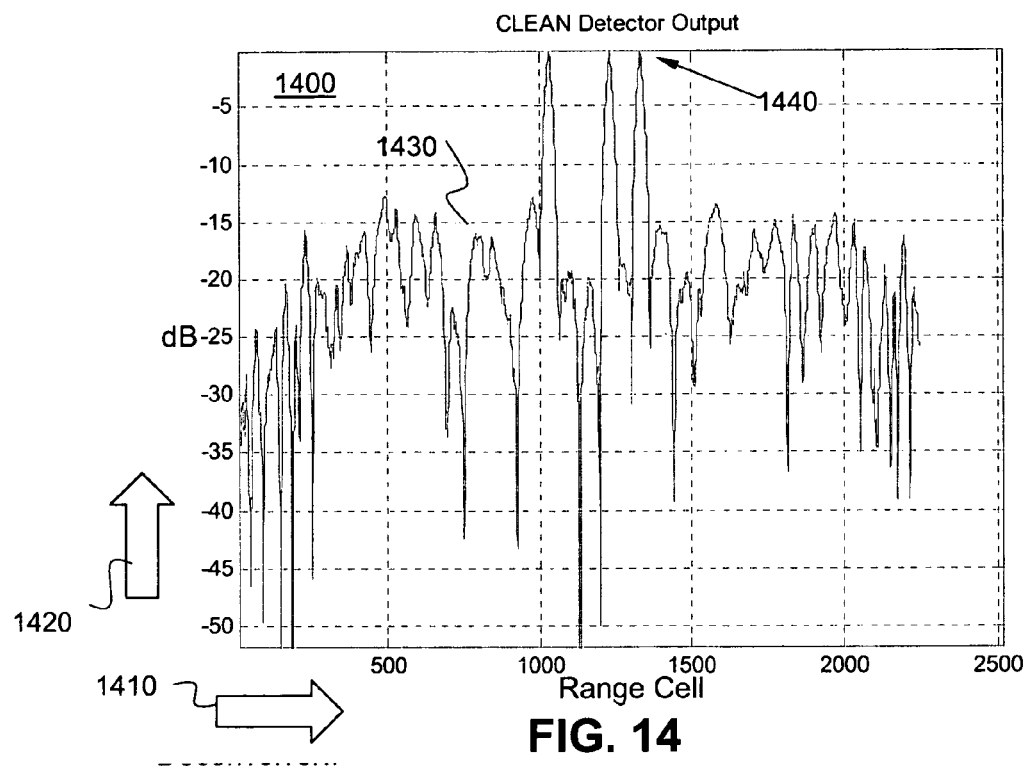
FIG. 14 is a graphical view of a CLEAN Detector output for small targets.

FIG. 14 shows a graphical view 1400 for the Reformulated CLEAN Detector used to detect the smaller targets. This plot 1400 shows range-time representing the abscissa 1410 and SNR in dB as the ordinate 1420. The signal 1430 shows three spikes 1440. The Reformulated CLEAN Detector has the effect of eliminating (i.e., occluding) the large target detected by the CLEAN Deconvolver. In plot 1400, the three smaller targets are detected as spikes 1430 with virtually no interference from the large target. Here, only the largest targets can be observed by the CLEAN Deconvolver.

Figure 15:
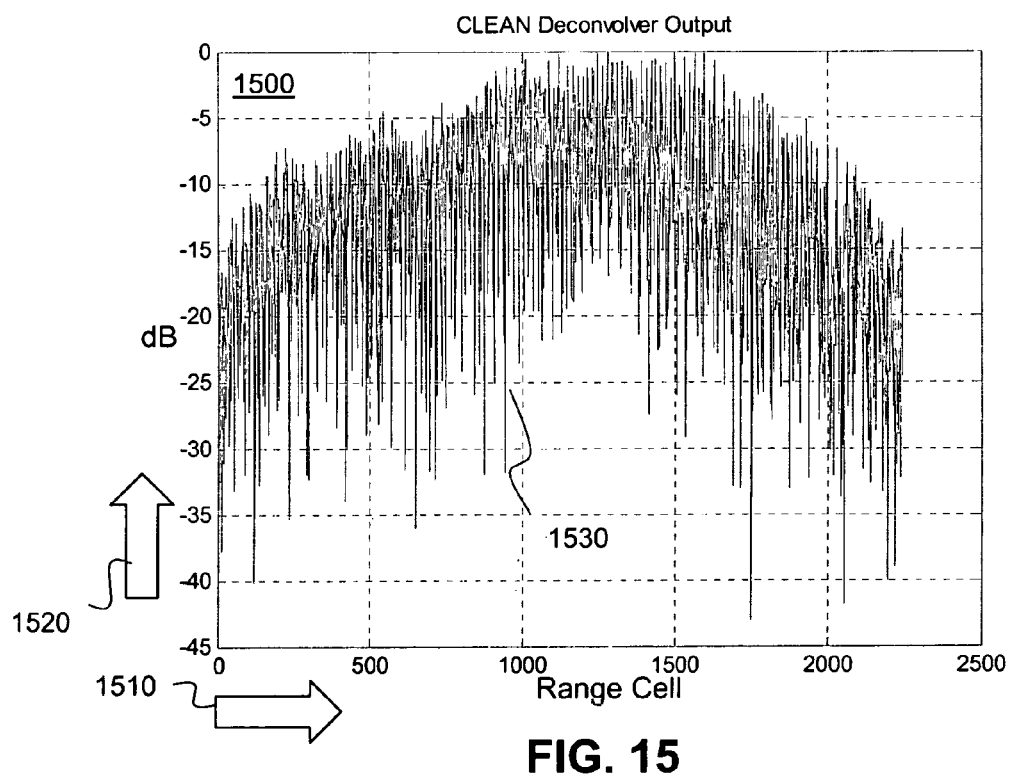
FIG. 15 is a graphical view of a CLEAN Deconvolver output for small targets.

FIG. 15 shows a graphical view 1500 of a situation to be analyzed in which the larger target has SNR too low to be detectable by the CLEAN Deconvolver. For this example, the larger target SNR is 8 dB while the three smaller targets have a SNR of −9 dB. This plot 1500 shows range-time representing the abscissa 1510 and SNR in dB as the ordinate 1520. In plot 1500, the Output of the CLEAN Deconvolver renders the large target undetectable, shown as signal 1530. The SNR of the large target is too small to enable detection by the CLEAN Deconvolver.

Figure 16:
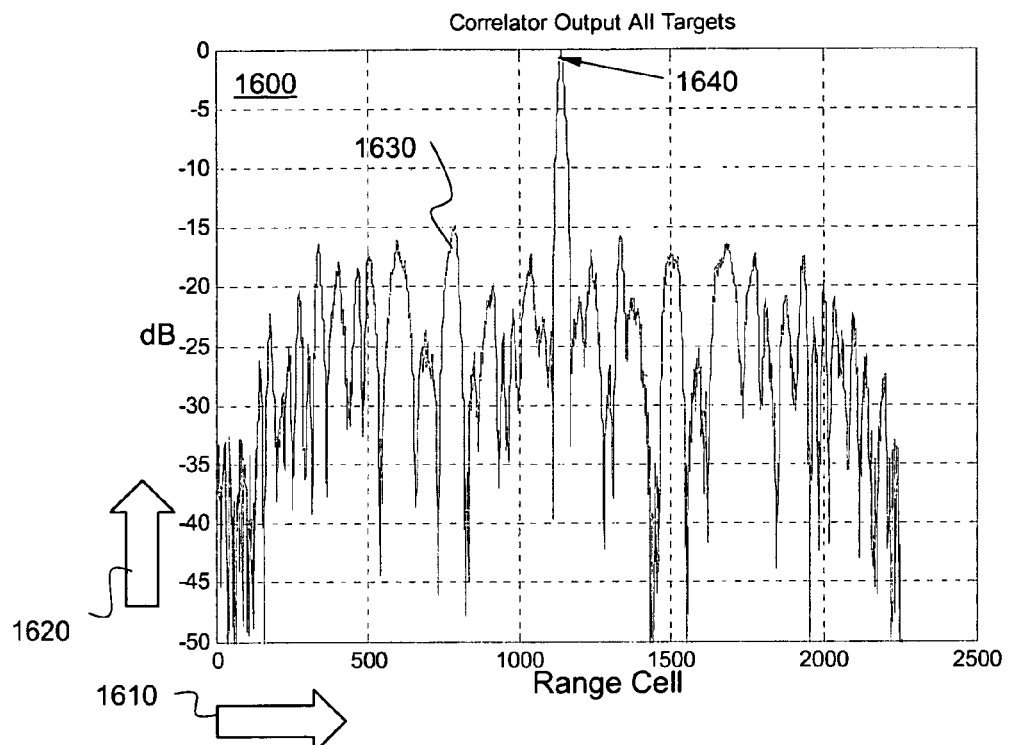
FIG. 16 is a graphical view of a Correlator output for all targets with low SNR.

FIG. 16 shows a graphical view 1600 of an Output of the Correlator in which the largest target is detected. This plot 1600 shows range-time representing the abscissa 1610 and SNR in dB as the ordinate 1620. The signal 1630 indicates the presence of the largest target by its accompanying spike 1640. Because the correlator has higher gain than the CLEAN Detector in the presence of noise, the correlator can detect the larger target. This is shown in plot 1600, in which Output of the Correlator shows the large target detected by the spike 1640. Because the larger target can be detected by the correlator in plot 1600, the amplitude and position of the target can be estimated by the correlator.

Figure 17:
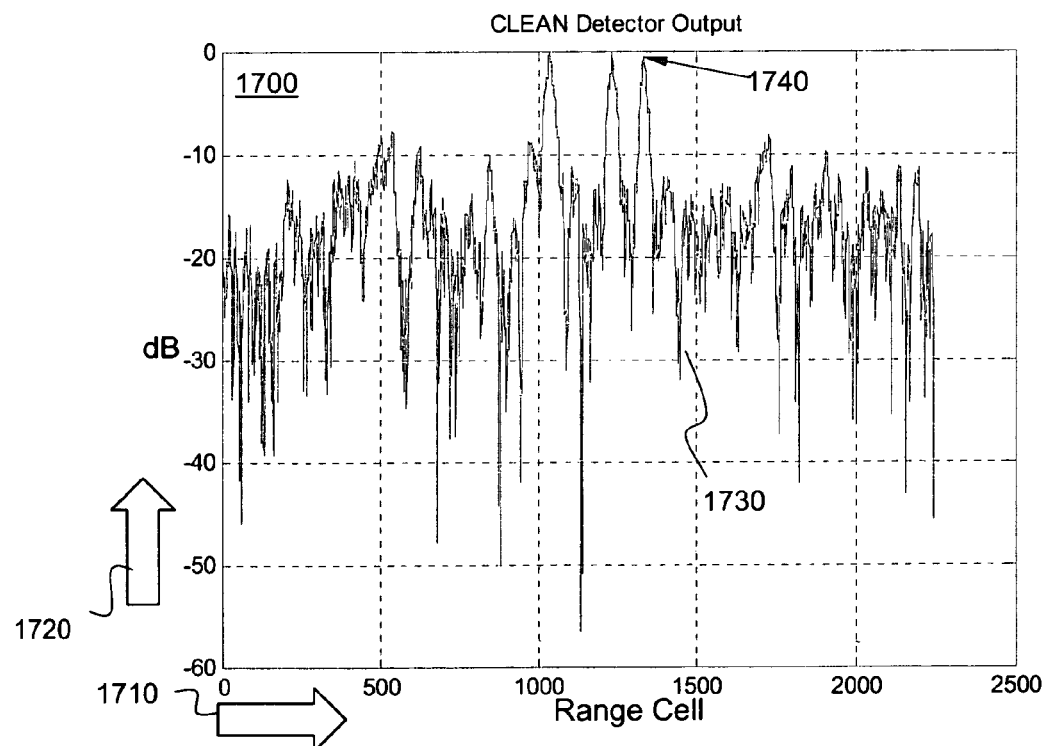
FIG. 17 is a graphical view of a Reformulated CLEAN Detector output for small SNR targets.

FIG. 17 shows a graphical view 1700 from estimation by the correlator using the Reformed CLEAN Detector. This plot 1700 shows range-time representing the abscissa 1710 and SNR in dB as the ordinate 1720. The signal 1730 also reveals three spikes 1740 indicating the smaller targets subsequent to occlusion of the largest target. Using the amplitude and position of the target can be estimated by the correlator, the Reformulated CLEAN Detector in plot 1700 can detect the three smaller targets.

Alternative to this methodology would be to change the waveform design of the radar to improve time-sidelobe performance. Any significant change in this area of the radar design could necessitate a companion change in the transmitter of the radar and possibly the antenna. Such changes would mean changing the most expensive parts of the radar.

In addition to waveform generator changes, there are other versions of the CLEAN algorithm that would mitigate the impact of large targets obscuring small targets. However, without the elements-1 and -2 these approaches would not achieve the level of performance of this methodology.

Various exemplary embodiments enable very low sidelobes for the detection of closely spaced targets with largely differing amplitudes. Other various embodiments alternatively or additionally provide for significantly improved resolution with waveforms that would otherwise have poor range resolution. Advantages include improved range resolution performance with existing radars by only changing the signal processing and leaving the waveform generator, transmitter chain and receiver chain intact. In addition, amplitude estimation accuracy is improved because this process includes a practical implementation of a minimum variance unbiased estimator.

Another advantage is improved detection of low signal to noise ratio (SNR) targets in the presence of large signal to noise ratio targets by simultaneously maximizing the SNR of the small targets and minimizing the SNR from previously detected large targets. A further advantage is improved target length estimates. Thus, waveforms are not constrained to be minimum phase. These techniques have application to sonar and seismology.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for analyzing a radar signal using CLEAN to identify an undetected target in sidelobes of a detected target, said method comprising:
   obtaining system impulse response data of a waveform for a point target having a signal data vector expressed as
   $$y = \tilde{W}^H c + n,$$
   where y represents said signal data vector, $\tilde{W}$ represents a convolution operation, superscript H is a conjugate transpose operation, c is a target amplitude vector, and n is an additive white Gaussian noise vector; and
   estimating said target amplitude vector c as
   $$\hat{c} = (\tilde{W}\tilde{W}^H)^{-1}\tilde{W}y,$$
   where $\hat{c}$ is a minimum variance unbiased estimate vector of said target amplitude vector c; and
   applying a CLEAN Deconvolver to remove the detected target from said signal data vector y as
   $$\bar{c} = \tilde{W}\tilde{W}^H c^-,$$
   where $\bar{c}$ is an estimate amplitude vector absent said detected target and $c^-$ represents an amplitude vector of the undetected target.

2. The method according to claim 1, further comprising:
   building a detected target vector $c^+$ with said amplitude estimate vector $\bar{c}$;
   setting to zero all elements of said detected target vector except at time t=0; and
   recomputing said amplitude estimate vector by a Reformulated CLEAN Detector as
   $$\bar{c} = \tilde{W}(\tilde{W}^H c^+ c^{+H} \tilde{W} + I)^{-1}$$
   where I is a noise amplitude identity matrix.

3. The method according to claim 1, wherein further comprising:
   adjusting select parameters until a product of frequency domain and convolution filter response is a reciprocal of sample rate, $1/(2f_0)$.

4. The method according to claim 1, wherein said obtaining operation of system impulse response data further comprises:
   transmitting a calibration signal as a driver signal vector s to said point target;
   receiving said signal data vector y that characterizes an impulse response of said point target.

5. The method according to claim 4, wherein said point target is a sphere.

6. The method according to claim 1, wherein said obtaining operation comprises:
   obtaining a first signal data vector $y_1$ for a first waveform as
   $$y_1 = \tilde{S}_1 h,$$
   where $\tilde{S}_1$ is a first convolution matrix constructed from a driving waveform vector $s_1$, and h is an impulse response independent of said driving waveform $s_1$; and
   synthesizing a second signal data vector $y_2$ for a second waveform as
   $$y_2 = \tilde{S}_2(\tilde{S}_1^H \tilde{S}_1)^{-1} \tilde{S}_1^H y_1,$$
   where $y_2$ is a synthetic data vector adjusted by calibration from said signal data vector $y_1$, and $\tilde{S}_2$ is a second convolution matrix constructed from a synthetic waveform vector $s_2$.

* * * * *